(12) United States Patent
Su et al.

(10) Patent No.: US 11,681,379 B1
(45) Date of Patent: Jun. 20, 2023

(54) MOUSE DEVICE

(71) Applicant: Primax Electronics Ltd., Taipei (TW)

(72) Inventors: Chun-Nan Su, Taipei (TW); Chun-Che Wu, Taipei (TW); Chun-Lin Chu, Taipei (TW); Shu-An Huang, Taipei (TW); Ming-Hao Hsieh, Taipei (TW); Sheng-An Tsai, Taipei (TW); Li-Kuei Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/947,794

(22) Filed: Sep. 19, 2022

(30) Foreign Application Priority Data

Sep. 4, 2022 (TW) .................................. 111133473

(51) Int. Cl.
*G06F 3/0354* (2013.01)
*G01P 3/44* (2006.01)
*G06F 3/0362* (2013.01)

(52) U.S. Cl.
CPC ............ *G06F 3/03543* (2013.01); *G01P 3/44* (2013.01); *G06F 3/0362* (2013.01)

(58) Field of Classification Search
CPC ...... G06F 3/033–0354; G06F 3/03543–03544; G06F 3/0362
See application file for complete search history.

(56) References Cited

U.S. PATENT DOCUMENTS 11,061,493 B1 * 7/2021 Cheng .................... G06F 3/0383
11,099,667 B1 * 8/2021 Cheng .................... G06F 3/0362

\* cited by examiner

*Primary Examiner* — Hang Lin
(74) *Attorney, Agent, or Firm* — Kirton McConkie; Evan R. Witt

(57) ABSTRACT

A mouse device includes a wheel control mechanism and a control unit. The control unit is electrically connected with a magnetic force module and a rotating speed detector of the wheel control mechanism. Under control of the control unit, a first direction current or a second direction current is selectively provided to drive the magnetic force module. The flowing directions of the first direction current and the second direction current are opposite. Consequently, the rotating mode of the wheel control mechanism can be switched between different modes.

15 Claims, 6 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system.

Generally, the operating interface of a mouse comprises a left button, a right button and a scroll wheel. For increasing the convenience and comfort of operating the scroll wheel of the mouse, some technologies have been disclosed. For example, Taiwanese Patent No. I448928 discloses a wheel module for an input device. One or two different toothed structures are formed in a recess or a hollow groove of the scroll wheel. Moreover, when a swinging arm is contacted with one of the toothed structures, the corresponding tactile feel is generated. Moreover, a hyper-fast roller structure of a mouse device is disclosed in Taiwanese Patent No. M498914. A tooth part and a stopping rod are installed in the wheel module. In case that the stopping rod is pushed by a torsion spring, the stopping rod is in close contact with the tooth part. When a button linked with the stopping rod is operated by the user, the roller is switched between a hyper-fast scrolling mode and an ordinary scrolling mode.

As mentioned above, in the conventional technologies, the wheel module generates more tactile feels by using a contact-type interference method. However, these designs still have some drawbacks. For example, the rotating mode of the wheel module cannot be switched immediately. Moreover, after the scroll wheel has been used for a long time, the contact-type interference method may wear the wheel module. If the wear condition of the wheel module is serious, the rotation of the wheel module cannot generate the tactile feel.

For solving the above drawbacks, it is important to provide a wheel control mechanism for quickly switching the rotating mode of a wheel module and reducing the wear problem of the wheel module.

SUMMARY OF THE INVENTION

The present invention provides a mouse device with a mechanism for quickly adjusting a rotating mode of a wheel module and effectively reducing the wear condition of the wheel module.

In accordance with an aspect of the present invention, a mouse device is provided. The mouse device includes a wheel control mechanism and a control unit. The wheel control mechanism includes a support base, a wheel module, a magnetic force module and a rotating speed detector. The support base includes a first supporting part and a second supporting part, which are combined together. The wheel module is rotatably installed on the first supporting part. The wheel module includes a wheel body and a metal ratchet. The wheel body includes a rotary shaft. The metal ratchet is connected with the rotary shaft. The metal ratchet is synchronously rotated with the wheel body. The magnetic force module is installed on the second supporting part. The magnetic force module includes a first magnetic conductor, a second magnetic conductor, a magnetic element and an electromagnet assembly. Each of the first magnetic conductor and the second magnetic conductor includes a first end and a second end opposed to the first end. The first end of the first magnetic conductor and the first end of the second magnetic conductor are aligned with a periphery region of the metal ratchet. The magnetic element is arranged between the first magnetic conductor and the second magnetic conductor and located near the first end of the first magnetic conductor and the first end of the second magnetic conductor. The electromagnet assembly is arranged between the second end of the first magnetic conductor and the second end of the second magnetic conductor. The rotating speed detector detects a rotating speed of the wheel body. The metal ratchet and the rotating speed detector are respectively installed on opposite sides of the wheel body. The control unit is electrically connected with the electromagnet assembly and the rotating speed detector. If a first direction current is provided to drive the electromagnet assembly under control of the control unit, like poles of the electromagnet assembly and the magnetic element face each other, and magnetic attractive forces generated at the first end of the first magnetic conductor and the first end of the second magnetic conductor attract the metal ratchet. Consequently, a rotation of the wheel body results in a tactile feel. If a second direction current is provided to drive the electromagnet assembly under control of the control unit, unlike poles of the electromagnet assembly and the magnetic element face each other, and the magnetic attractive forces generated at the first end of the first magnetic conductor and the first end of the second magnetic conductor are attenuated. Consequently, the rotation of the wheel body does not result in the tactile feel.

In an embodiment, the control unit includes a firmware, and the firmware contains a preset speed threshold value.

In an embodiment, if the rotating speed of the wheel body is lower than the speed threshold value, the first direction current is provided to drive the electromagnet assembly under control of the control unit. Whereas, if the rotating speed of the wheel body is higher than the speed threshold value, the second direction current is provided to drive the electromagnet assembly under control of the control unit.

In an embodiment, the periphery region of the metal ratchet has a toothed structure, and the toothed structure includes plural convex parts and plural concave parts. The plural convex parts and the plural concave parts are alternatively arranged on the periphery region of the metal ratchet.

In an embodiment, the first end of the first magnetic conductor and the first end of the second magnetic conductor include claw structures, and the claw structures are aligned with the corresponding convex parts.

In an embodiment, the first magnetic conductor and the second magnetic conductor are silicon steel sheets.

In an embodiment, the magnetic element is a strong magnet.

In an embodiment, the electromagnet assembly includes a bobbin, a coil and a low-coercivity metal. The low-coercivity metal is disposed within the bobbin. The coil is wound around an outer surface of the bobbin.

In an embodiment, the first direction current or the second direction current selectively flows through the coil under control of the control unit. Consequently, a direction of a magnetic field of the low-coercivity metal is correspondingly changed.

In an embodiment, the low-coercivity metal is an Alnico alloy.

In an embodiment, the second supporting part includes an installation recess and a covering plate. The magnetic force module is disposed within the installation recess. The installation recess is covered by the covering plate.

In an embodiment, the installation recess includes a first installation part, a second installation part, an upper communication part and a lower communication part. The upper communication part and the lower communication part are respectively located at two opposite sides of the installation recess. The upper communication part and the lower communication part are in communication with the first installation part and the second installation part.

In an embodiment, the first magnetic conductor is disposed within the upper communication part, the second magnetic conductor is disposed within the lower communication part, and the first end of the first magnetic conductor and the first end of the second magnetic conductor are protruded outside the installation recess and located near the periphery region of the metal ratchet. The magnetic element is disposed within the first installation part. The electromagnet assembly is disposed within the second installation part.

In an embodiment, the control unit is a flash memory, an electrically-erasable programmable read-only memory (EEPROM) or a programmable read-only memory (PROM).

In an embodiment, the support base further includes a fixing part, and the fixing part is located beside the first supporting part.

From the above descriptions, the present invention provides the mouse device. In the mouse device, the rotating mode of the wheel module is adjusted according to the interaction between the magnetic element with the fixed-direction magnetic field and the electromagnet assembly with the direction-changeable magnetic field in a non-contact manner. Consequently, the wheel body of the wheel module can be rotated in the non-tactile manner or the multi-tactile manner. When compared with the conventional technology of using the contact-type interference method to adjust the rotating mode of the wheel module, the interaction between the magnetic element and the electromagnet assembly in the module in the non-contact manner can not only switch the rotating mode of the wheel module more quickly, but also reduce the wear condition of the wheel module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
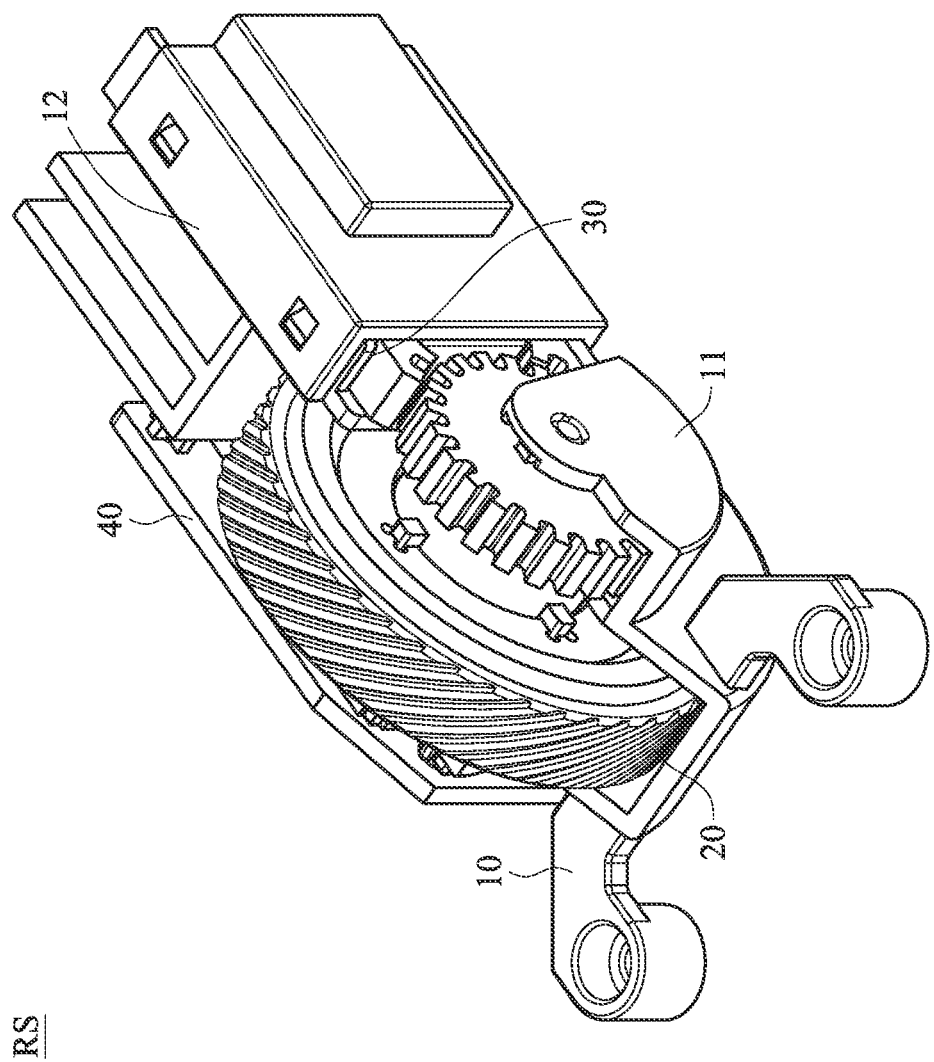
FIG. 1A is a schematic perspective view illustrating a wheel control mechanism according to an embodiment of the present invention.
Figure 1B:
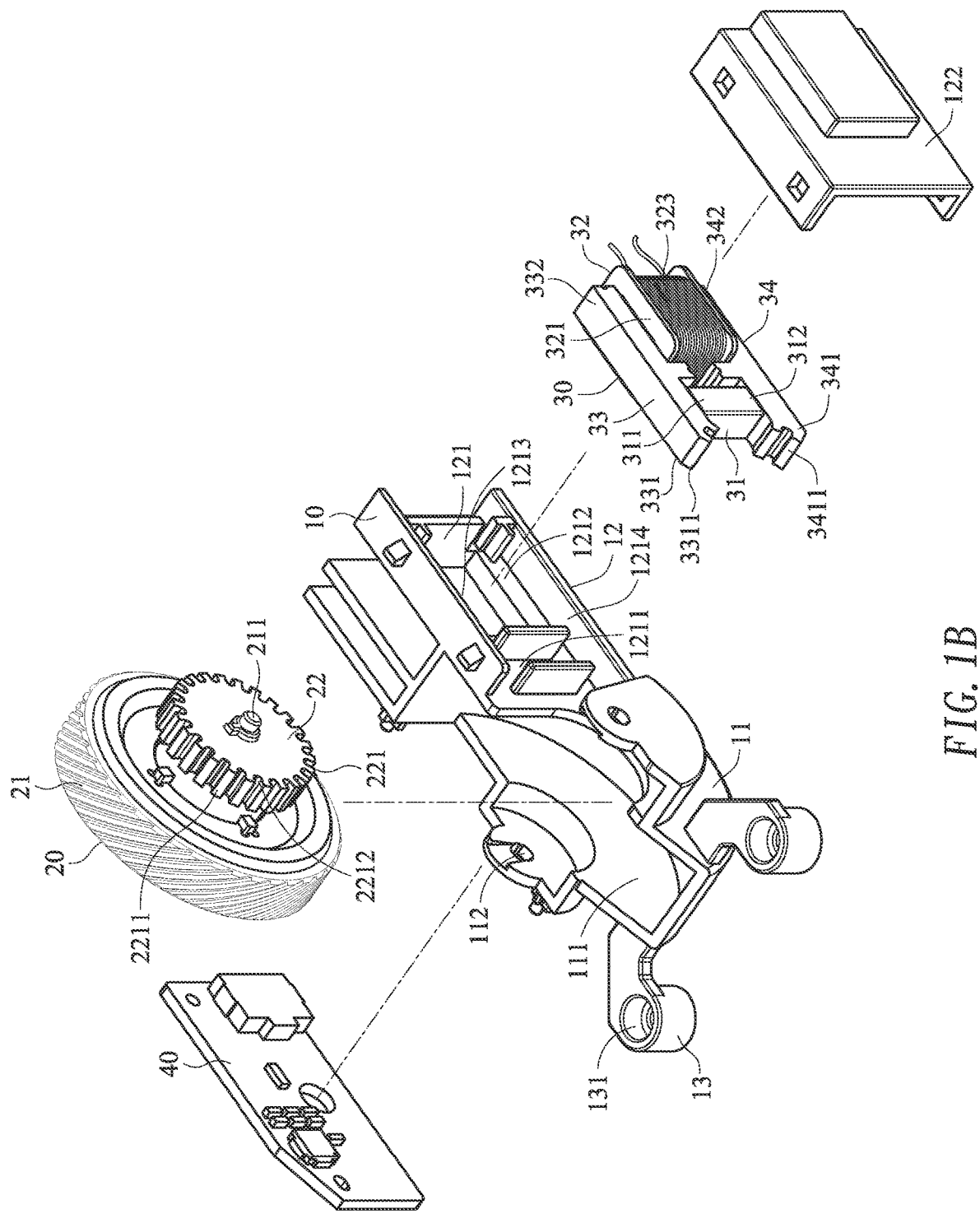
FIG. 1B is a schematic exploded view illustrating the wheel control mechanism according to the embodiment of the present invention.
Figure 1C:
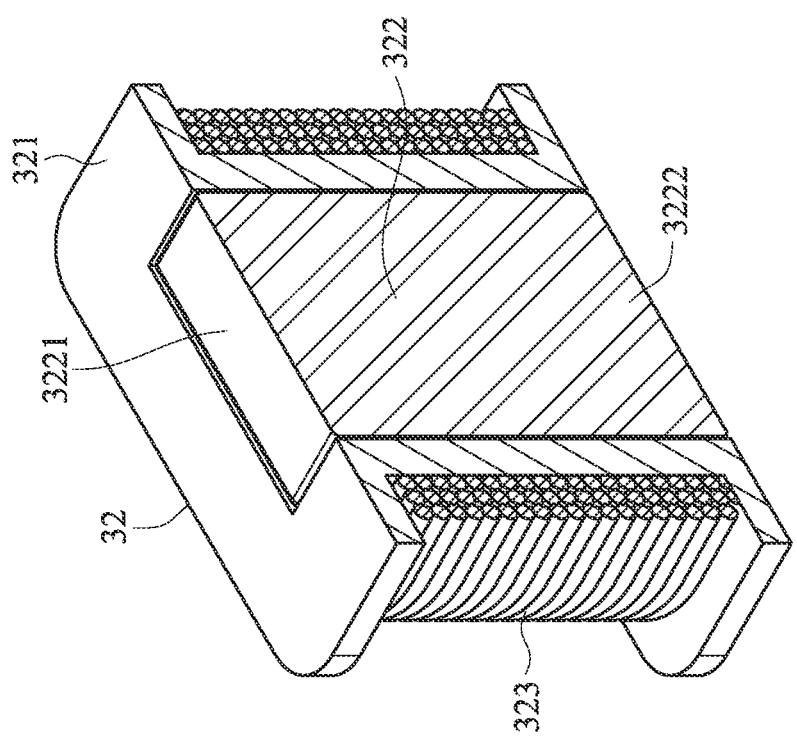
FIG. 1C is a schematic cutaway view illustrating an electromagnet assembly of the wheel control mechanism according to the embodiment of the present invention.

Please refer to FIGS. 1A, 1B and 1C. FIG. 1A is a schematic perspective view illustrating a wheel control mechanism according to an embodiment of the present invention. FIG. 1B is a schematic exploded view illustrating the wheel control mechanism according to the embodiment of the present invention. FIG. 1C is a schematic cutaway view illustrating an electromagnet assembly of the wheel control mechanism according to the embodiment of the present invention.

In an embodiment, the wheel control mechanism RS comprises a support base 10, a wheel module 20, a magnetic force module 30 and a rotating speed detector 40.

The support base 10 comprises a first supporting part 11, a second supporting part 12 and a fixing part 13, which are combined together. The wheel module 20 and the magnetic force module 30 are installed on the first supporting part 11 and the second supporting part 12, respectively.

Please refer to FIG. 1B. The first supporting part 11 comprises a receiving recess 111 and two first pivotal holes 112. The two first pivotal holes 112 are respectively formed in two opposite lateral walls of the receiving recess 111. The wheel module 20 comprises a wheel body 21 and a metal ratchet 22. The wheel body 21 comprises a rotary shaft 211. The metal ratchet 22 is installed on a first side of the wheel body 21. Moreover, the metal ratchet 22 is connected with the rotary shaft 211. Consequently, the metal ratchet 22 can be synchronously rotated with the wheel body 21. In an embodiment, a periphery region of the metal ratchet 22 has a toothed structure 221. In addition, the toothed structure 221 comprises plural convex parts 2211 and plural concave parts 2212, which are alternatively arranged on the periphery region of the metal ratchet 22.

A portion of the wheel module 20 is accommodated within the receiving recess 111. The rotary shaft 211 of the wheel module 20 is inserted into the first pivotal holes 112. Consequently, the wheel module 20 can be rotatably installed on the first supporting part 11. Moreover, the rotating speed detector 40 is installed on a second side of the wheel body 21, which is opposed to the first side of the wheel body 21. In other words, the rotating speed detector 40 and the metal ratchet 22 are installed on two opposite sides with respect to the wheel body 21. The rotating speed detector 40 is used for detecting the rotating speed of the wheel body 21 and generating a corresponding control signal. In some other possible embodiments, the rotating speed detector 40 is installed on the first supporting part 11. Alternatively, a main circuit board (not shown) of the mouse device is equipped with an additional support structure, and the rotating speed detector 40 is installed on the additional support structure.

The second supporting part 12 comprises an installation recess 121 and a covering plate 122. The installation recess 121 is covered by the covering plate 122. The magnetic force module 30 is disposed within the installation recess 121. In an embodiment, the installation recess 121 comprises a first installation part 1211, a second installation part 1212, an upper communication part 1213 and a lower communication part 1214. The first installation part 1211 and the second installation part 1212 are located beside each other. The upper communication part 1213 and the lower communication part 1214 are opposed to each other. In an embodiment, the upper communication part 1213 and the lower communication part 1214 are respectively located at a top side and a bottom side of the installation recess 121. Moreover, the upper communication part 1213 and the lower communication part 1214 are in communication with the first installation part 1211 and the second installation part 1212.

The magnetic force module 30 comprises a magnetic element 31, an electromagnet assembly 32 and two magnetic conductors 33 and 34.

The magnetic element 31 is a strong magnet. Moreover, the magnetic element 31 comprises an N-pole terminal 311 and an S-pole terminal 312. The electromagnet assembly 32 comprises a bobbin 321, a low-coercivity metal 322 (see FIG. 1C) and a coil 323. For example, the low-coercivity metal 322 is an Alnico alloy that is primarily made up of the combination of aluminum, nickel and cobalt. The low-coercivity metal 322 is disposed within the bobbin 321. Moreover, the low-coercivity metal 322 has a first end 3221 and a second end 3222, which are opposed to each other. The coil 323 is wound around the outer surface of the bobbin 321. For example, the two magnetic conductors 33 and 34 are silicon steel sheets. The magnetic conductor 33 comprises a first end 331 and a second end 332, which are opposed to each other. The magnetic conductor 34 comprises a first end 341 and a second end 342, which are opposed to each other. The first end 331 of the magnetic conductor 33 has a claw structure 3311. The first end 341 of the magnetic conductor 34 has a claw structure 3411.

The magnetic element 31 is arranged between the magnetic conductor 33 and the magnetic conductor 34. Moreover, the magnetic element 31 is located near the first end 331 of the magnetic conductor 33 and the first end 341 of the magnetic conductor 34. The electromagnet assembly 32 is arranged between the second end 332 of the magnetic conductor 33 and the second end 342 of the magnetic conductor 34. In this embodiment, the magnetic conductor 33 and the magnetic conductor 34 are disposed within the upper communication part 1213 and the lower communication part 1214, respectively. The first end 331 of the magnetic conductor 33 and the first end 341 of the magnetic conductor 34 are protruded outside the installation recess 121 and located near the toothed structure 221 on the periphery region of the metal ratchet 22. The magnetic element 31 is disposed within the first installation part 1211 of the installation recess 121. Moreover, the N-pole terminal 311 of the magnetic element 31 is in close contact with the magnetic conductor 33, and the S-pole terminal 312 of the magnetic element 31 is in close contact with the magnetic conductor 34. The electromagnet assembly 32 is disposed within the second installation part 1212 of the installation recess 121. Moreover, the first end 3221 and the second end 3222 of the low-coercivity metal 322 are in close contact with the magnetic conductor 33 and the magnetic conductor 34, respectively.

The wheel control mechanism RS is fixed on a casing (not shown) or a main circuit board (not shown) of the mouse device through the fixing part 13. In this embodiment, the fixing part 13 is located beside the first supporting part 11. Moreover, the fixing part 13 has at least one fastening hole 131. After a fastening element such as a screw (not shown) is penetrated through the fastening hole 131, the fixing part 13 is tightened into the casing or the main circuit board of the mouse device.

Figure 2:
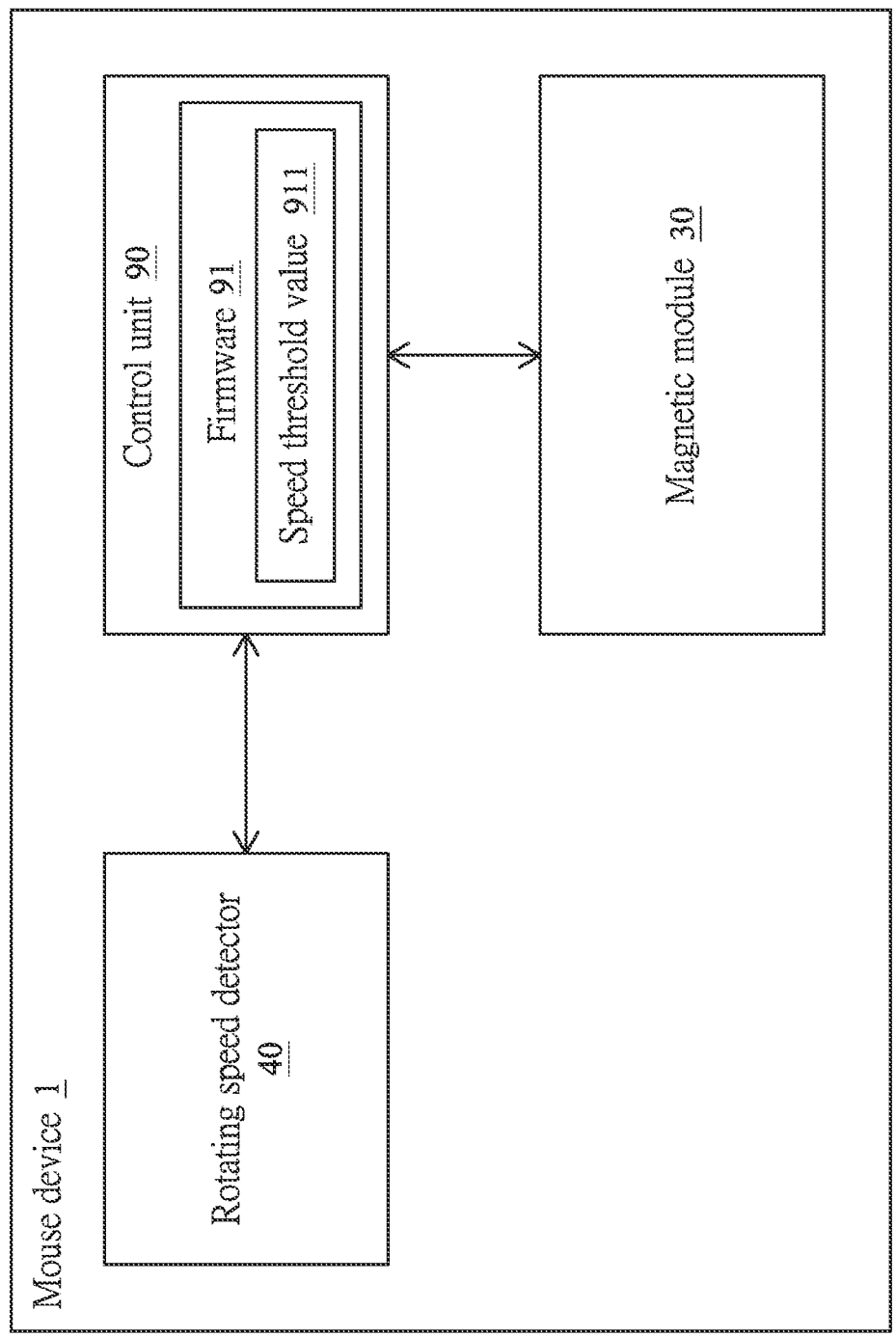
FIG. 2 is a schematic system block diagram illustrating the mouse device according to the embodiment of the present invention.

FIG. 2 is a schematic system block diagram illustrating the mouse device according to the embodiment of the present invention. As shown in FIG. 2, the mouse device 1 comprises a control unit 90. The control unit 90 is electrically connected with the magnetic force module 30 and the rotating speed detector 40 of the wheel control mechanism RS as shown in FIG. 1B. The control unit 90 is installed on the main circuit board (not shown) of the mouse device 1. For example, the control unit 90 is a flash memory, an electrically-erasable programmable read-only memory (EEPROM) or a programmable read-only memory (PROM). The control unit 90 comprises a firmware 91. The firmware 91 contains a preset speed threshold value 911. After the rotating speed of the wheel body 21 (see FIG. 1B) is detected by the rotating speed detector 40, the information about the rotating speed is transmitted to the control unit 90. Under control of the control unit 90, a first direction current or a second direction current is selectively provided to drive the electromagnet assembly 32 of the magnetic force module 30 according to the rotating speed information. The first direction current and the second direction current are DC currents. Moreover, the flowing directions of the first direction current and the second direction current are opposite. Consequently, the rotating mode of the wheel module 20 can be switched between different modes.

Figure 3:
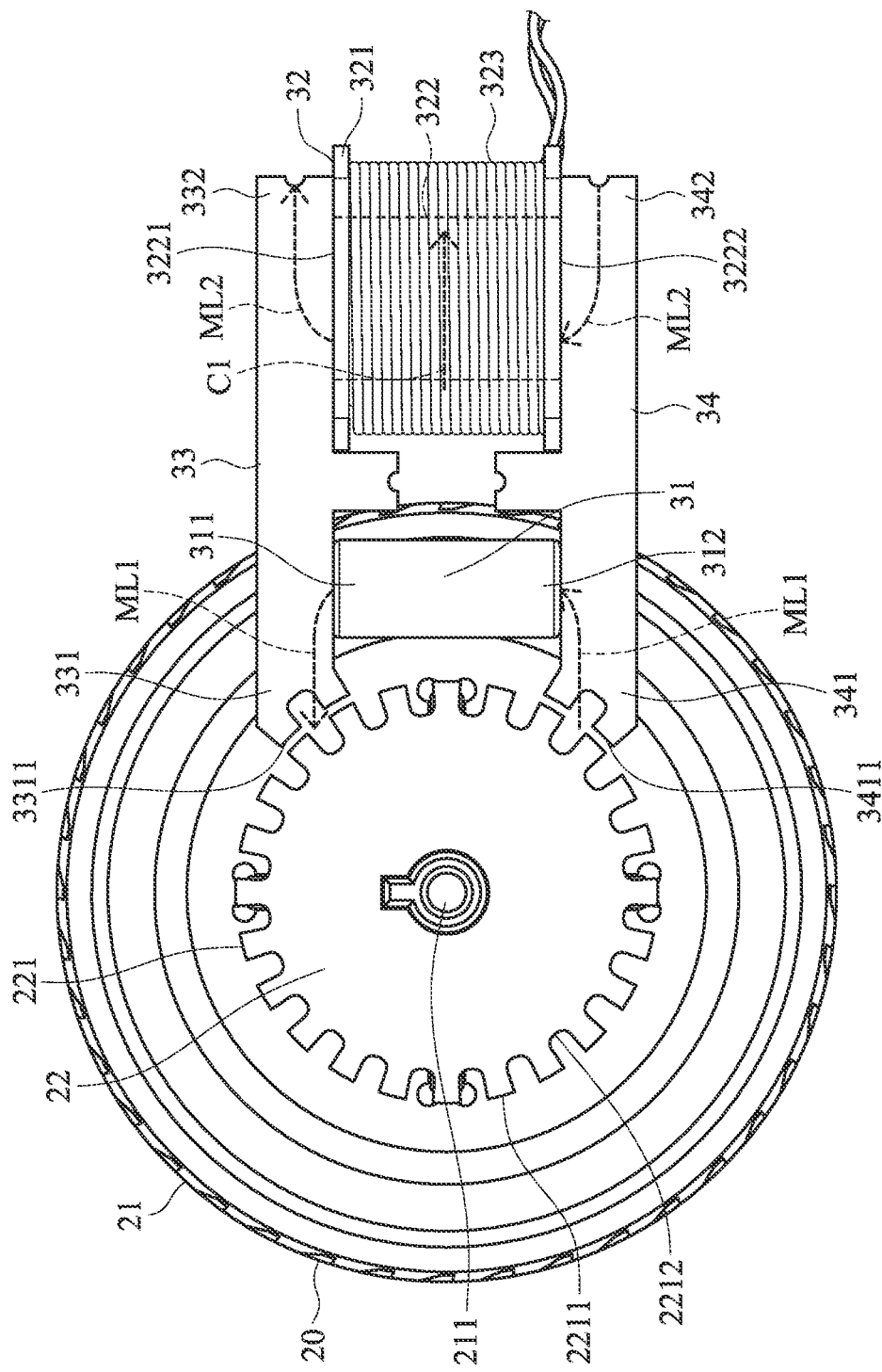
FIG. 3 is a schematic side view illustrating the operation of the wheel control mechanism of the mouse device of the present invention in a first rotating mode.

Please refer to FIG. 3. FIG. 3 is a schematic side view illustrating the operation of the wheel control mechanism of the mouse device of the present invention in a first rotating mode. Under control of the control unit 90, the first direction current Cl is provided to drive the electromagnet assembly 32. When the first direction current Cl flows through the coil 323, the first end 3221 and the second end 3222 of the low-coercivity metal 322 respectively become an N-pole terminal and an S-pole terminal according to Ampere's right hand rule. Under this circumstance, like poles of the magnetic element 31 and the electromagnet assembly 32 are aligned with each other. Consequently, the magnetic element 31 and the electromagnet assembly 32 are magnetically repulsed by each other. That is, the N-pole terminal 311 of the magnetic element 31 and the N-pole terminal of the low-coercivity metal 322 (i.e., the first end 3221 of the low-coercivity metal 322) are aligned with each other, and the S-pole terminal 312 of the magnetic element 31 and the S-pole terminal of the low-coercivity metal 322 (i.e., the second end 3222 of the low-coercivity metal 322) are aligned with each other. Under this circumstance, the magnetic field line ML1 emitted by the N-pole terminal 311 of the magnetic element 31 and the magnetic field line ML2 emitted by the first end 3221 of the low-coercivity metal 322 are repelled by each other. Consequently, the magnetic field produced by the magnetic element 31 is deflected to the first end 331 of the magnetic conductor 33 and the first end 341 of the magnetic conductor 34. Under this circumstance, the first end 331 of the magnetic conductor 33 and the first end 341 of the magnetic conductor 34 generate the magnetic attractive forces to attract the metal ratchet 22. As a consequence, the rotating speed of the metal ratchet 22 is reduced.

As shown in FIG. 3, the gap between each of the claw structures 3311 and 3411 at the first ends 331 and 341 of the magnetic conductors 33 and 34 and the corresponding convex part 2211 of the toothed structure 221 is smaller than the gap between each of the claw structures 3311 and 3411 at the first ends 331 and 341 of the magnetic conductors 33 and 34 and the corresponding concave part 2212 of the toothed structure 221. While the metal ratchet 22 is rotated, the relation between any position of the toothed structure 221 of the metal ratchet 22 and the claw structures 3311 and 3411 is dynamically changed. At the moment when the claw structures 3311 and 3411 face the corresponding convex parts 2211 in the rotating process of the metal ratchet 22, the strengths of the generated magnetic attractive forces are larger. In response to the larger strengths of the generated magnetic attractive forces, the rotating speed of the wheel body 21 is instantly reduced. Due to this structural design, the rotation of the wheel body 21 can result in the tactile feel.

In some possible embodiments, the spacing interval between every two adjacent convex parts 2211 is adjusted. For example, the size of the concave part 2212 is increased or decreased. Consequently, the tactile feel generated in response to the rotation of the wheel body 21 is correspondingly adjusted.

In some other embodiments, the magnitude of the first direction current C1 for driving the electromagnet assembly 32 is adjustable. In response to different magnitudes of the first direction current C1, the electromagnet assembly 32 can generate the magnetic field with different strengths. Consequently, the strengths of the magnetic attractive forces at the first ends 331 and 341 of the magnetic conductors 33 and 34 are correspondingly changed. Due to this structural design, the rotation of the wheel body 21 can result in one of plural different tactile feels.

On the other hand, if no DC current is provided to the electromagnet assembly 32 under control of the control unit 90, the magnetic field produced by the magnetic element 31 is not deflected. Under this circumstance, the strengths of the magnetic attractive force at the first ends 331 and 341 of the magnetic conductors 33 and 34 are relatively weak. Consequently, while the wheel body 21 is rotated, the tactile feel is less obvious.

Figure 4:
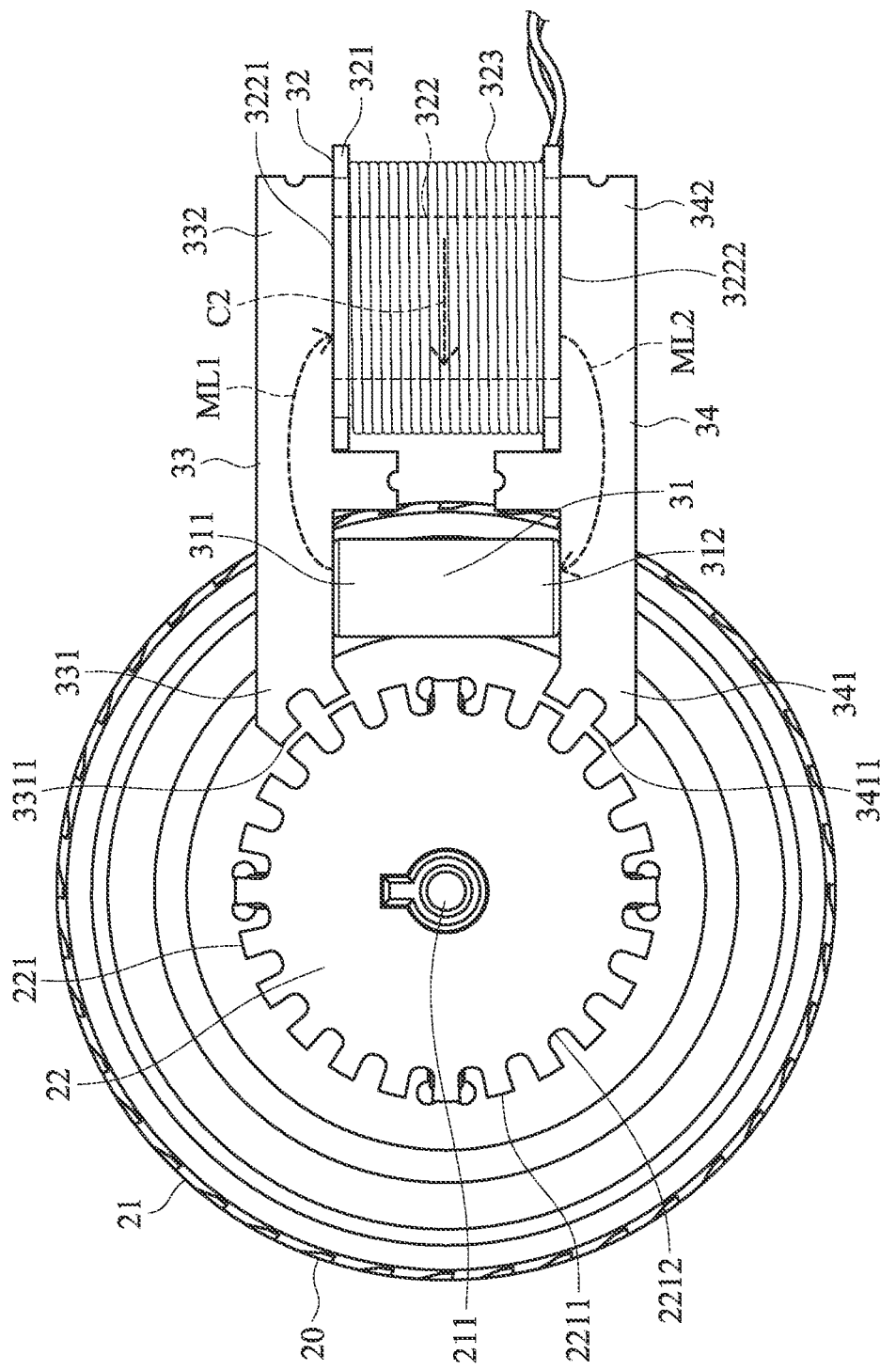
FIG. 4 is a schematic side view illustrating the operation of the wheel control mechanism of the mouse device of the present invention in a second rotating mode.

Please refer to FIG. 4. FIG. 4 is a schematic side view illustrating the operation of the wheel control mechanism of the mouse device of the present invention in a second rotating mode. Under control of the control unit 90, the second direction current C2 is provided to drive the electromagnet assembly 32. When the second direction current C2 flows through the coil 323, the first end 3221 and the second end 3222 of the low-coercivity metal 322 respectively become the S-pole terminal and the N-pole terminal according to Ampere's right hand rule. Under this circumstance, unlike poles of the magnetic element 31 and the electromagnet assembly 32 are aligned with each other. That is, the N-pole terminal 311 of the magnetic element 31 and the S-pole terminal of the low-coercivity metal 322 (i.e., the first end 3221 of the low-coercivity metal 322) are aligned with each other, and the S-pole terminal 312 of the magnetic element 31 and the N-pole terminal of the low-coercivity metal 322 (i.e., the second end 3222 of the low-coercivity metal 322) are aligned with each other. Under this circumstance, the magnetic field line ML1 emitted by the N-pole terminal 311 of the magnetic element 31 is introduced into the S-pole terminal of the low-coercivity metal 322 (i.e., the first end 3221 of the low-coercivity metal 322), and the magnetic field line ML2 emitted by the N-pole terminal of the low-coercivity metal 322 (i.e., the second end 3222 of the low-coercivity metal 322) is introduced into the S-pole terminal 312 of the magnetic element 31. In other words, a closed-loop magnetic field is generated by the magnetic element 31 and the low-coercivity metal 322 collaboratively. Since the magnetic attractive forces at the first end 331 of the magnetic conductor 33 and the first end 341 of the magnetic conductor 34 are attenuated and unable to attract the metal ratchet 22, the wheel body 21 can be smoothly rotated without resulting in the tactile feel.

Please refer to FIGS. 2, 3 and 4 again. After the rotating speed of the wheel body 21 is detected by the rotating speed detector 40, the information about the rotating speed is transmitted to the control unit 90. According to the rotating speed of the wheel body 21 and the speed threshold value 911, the control unit 90 determines the rotating mode of the wheel body 21. For example, the speed threshold value 911 is 2.83 rps (revolutions per second). If the rotating speed of the wheel body 21 is higher than the speed threshold value 911, the wheel body 21 is operated in a hyper-fast scrolling mode. Whereas, if the rotating speed of the wheel body 21 is lower than the speed threshold value 911, the wheel body 21 is operated in an ordinary scrolling mode.

For example, if the wheel body 21 is quickly rotated by the user and the rotating speed of the wheel body 21 is higher than the speed threshold value 911, it means that the wheel body 21 needs to be operated in the hyper-fast scrolling mode. Since the wheel body 21 is rotated quickly, plural pages shown on the display screen can be browsed quickly. For achieving this purpose, the second direction current C2 is provided to drive the electromagnet assembly 32 under control of the control unit 90. Since the magnetic attractive forces at the first end 331 of the magnetic conductor 33 and the first end 341 of the magnetic conductor 34 are attenuated, the wheel body 21 can be smoothly rotated without resulting in the tactile feel.

On the other hand, if the rotating speed of the wheel body 21 is lower than the speed threshold value 911, it means that the wheel body 21 needs to be operated in the ordinary scrolling mode. For achieving this purpose, the first direction current C1 is provided to drive the electromagnet assembly 32 under control of the control unit 90. Since the magnetic attractive forces at the first end 331 of the magnetic conductor 33 and the first end 341 of the magnetic conductor 34 are strengthened, the rotation of the wheel body 21 can result in the tactile feel.

It is noted that the speed threshold value 911 is not restricted. The speed threshold value 911 may be varied according to the size of the wheel body 21 or according to the practical requirements. For example, in some possible embodiments, the speed threshold value 911 contains plural sets of speed threshold value From the above descriptions, the present invention provides the mouse device. In the mouse device, the rotating mode of the wheel module is adjusted according to the interaction between the magnetic element with the fixed-direction magnetic field and the electromagnet assembly with the direction-changeable magnetic field in a non-contact manner. Consequently, the wheel body of the wheel module can be rotated in the non-tactile manner or the multi-tactile manner. When compared with the conventional technology of using the contact-type interference method to adjust the rotating mode of the wheel module, the non-contact manner between the wheel module and the magnetic force module can not only switch the rotating mode of the wheel module more quickly, but also reduce the wear condition of the wheel module. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
    a wheel control mechanism comprising:
        a support base comprising a first supporting part and a second supporting part, which are combined together;
        a wheel module rotatably installed on the first supporting part, and comprising a wheel body and a metal ratchet, wherein the wheel body comprises a rotary shaft, the metal ratchet is connected with the rotary shaft, and the metal ratchet is synchronously rotated with the wheel body;
        a magnetic force module installed on the second supporting part, and comprising a first magnetic conductor, a second magnetic conductor, a magnetic element and an electromagnet assembly, wherein each of the first magnetic conductor and the second magnetic conductor comprises a first end and a second end opposed to the first end, wherein the first end of the first magnetic conductor and the first end of the second magnetic conductor are aligned with a periphery region of the metal ratchet, the magnetic element is arranged between the first magnetic conductor and the second magnetic conductor and located near the first end of the first magnetic conductor and the first end of the second magnetic conductor, and the electromagnet assembly is arranged between the second end of the first magnetic conductor and the second end of the second magnetic conductor; and
        a rotating speed detector that detects a rotating speed of the wheel body, wherein the metal ratchet and the rotating speed detector are respectively installed on opposite sides of the wheel body; and
    a control unit electrically connected with the electromagnet assembly and the rotating speed detector,
    wherein if a first direction current is provided to drive the electromagnet assembly under control of the control unit, like poles of the electromagnet assembly and the magnetic element face each other, and magnetic attractive forces generated at the first end of the first magnetic conductor and the first end of the second magnetic conductor attract the metal ratchet, so that a rotation of the wheel body results in a tactile feel,
        wherein if a second direction current is provided to drive the electromagnet assembly under control of the control unit, unlike poles of the electromagnet assembly and the magnetic element face each other, and the magnetic attractive forces generated at the first end of the first magnetic conductor and the first end of the second magnetic conductor are attenuated, so that the rotation of the wheel body does not result in the tactile feel.

2. The mouse device according to claim 1, wherein the control unit comprises a firmware, and the firmware contains a preset speed threshold value.

3. The mouse device according to claim 2, wherein if the rotating speed of the wheel body is lower than the speed threshold value, the first direction current is provided to drive the electromagnet assembly under control of the control unit, wherein if the rotating speed of the wheel body is higher than the speed threshold value, the second direction current is provided to drive the electromagnet assembly under control of the control unit.

4. The mouse device according to claim 1, wherein the periphery region of the metal ratchet has a toothed structure, and the toothed structure comprises plural convex parts and plural concave parts, wherein the plural convex parts and the plural concave parts are alternatively arranged on the periphery region of the metal ratchet.

5. The mouse device according to claim 4, wherein the first end of the first magnetic conductor and the first end of the second magnetic conductor comprise claw structures, and the claw structures are aligned with the corresponding convex parts.

6. The mouse device according to claim 1, wherein the first magnetic conductor and the second magnetic conductor are silicon steel sheets.

7. The mouse device according to claim 1, wherein the magnetic element is a strong magnet.

8. The mouse device according to claim 1, wherein the electromagnet assembly comprises a bobbin, a coil and a low-coercivity metal, wherein the low-coercivity metal is disposed within the bobbin, and the coil is wound around an outer surface of the bobbin.

9. The mouse device according to claim 8, wherein under control of the control unit, the first direction current or the second direction current selectively flows through the coil, so that a direction of a magnetic field of the low-coercivity metal is correspondingly changed.

10. The mouse device according to claim 8, wherein the low-coercivity metal is an Alnico alloy.

11. The mouse device according to claim 1, wherein the second supporting part comprises an installation recess and a covering plate, wherein the magnetic force module is disposed within the installation recess, and the installation recess is covered by the covering plate.

12. The mouse device according to claim 11, wherein the installation recess comprises a first installation part, a second installation part, an upper communication part and a lower communication part, wherein the upper communication part and the lower communication part are respectively located at two opposite sides of the installation recess, and the upper communication part and the lower communication part are in communication with the first installation part and the second installation part.

13. The mouse device according to claim 12, wherein the first magnetic conductor is disposed within the upper communication part, the second magnetic conductor is disposed within the lower communication part, and the first end of the first magnetic conductor and the first end of the second magnetic conductor are protruded outside the installation recess and located near the periphery region of the metal ratchet, wherein the magnetic element is disposed within the first installation part, and the electromagnet assembly is disposed within the second installation part.

14. The mouse device according to claim 1, wherein the control unit is a flash memory, an electrically-erasable programmable read-only memory (EEPROM) or a programmable read-only memory (PROM).

15. The mouse device according to claim 1, wherein the support base further comprises a fixing part, and the fixing part is located beside the first supporting part.

* * * * *